(12) United States Patent
Camburn

(10) Patent No.: US 6,390,673 B1
(45) Date of Patent: May 21, 2002

(54) METHOD AND APPARATUS FOR EXTENDING THE LIFE OF A HOT GAS DUCT THERMOWELL TUBE

(75) Inventor: John E. Camburn, Garden Grove, CA (US)

(73) Assignee: Watson Cogeneration Company, Carson, CA (US)

( * ) Notice: Subject to any disclaimer, the term of this patent is extended or adjusted under 35 U.S.C. 154(b) by 0 days.

(21) Appl. No.: 09/546,235

(22) Filed: Apr. 10, 2000

(51) Int. Cl.[7] ............................ G01K 7/02; G01K 13/02
(52) U.S. Cl. ..................... 374/179; 374/138; 374/148
(58) Field of Search ............................ 374/136, 179, 374/208, 148, 138

(56) References Cited

U.S. PATENT DOCUMENTS

| | | | | |
|---|---|---|---|---|
| 3,245,260 A | * | 4/1966 | Werner | 374/148 |
| 3,940,988 A | * | 3/1976 | Reed | 374/148 |
| 4,449,403 A | * | 5/1984 | McQueen | 374/148 |
| 4,934,179 A | * | 6/1990 | Biggerstaff | 73/40.5 R |
| 5,427,452 A | * | 6/1995 | Stuart | 374/179 |
| 5,772,324 A | * | 6/1998 | Falk | 374/179 |
| 6,059,453 A | * | 5/2000 | Kempf et al. | 374/179 |

* cited by examiner

Primary Examiner—Diego Gutierrez
Assistant Examiner—Madeline Gonzalez
(74) Attorney, Agent, or Firm—Ekkehard Schoettle; F. Lindsey Scott

(57) ABSTRACT

A method and apparatus for extending the life of a thermowell tube positioned in a hot gas duct to contain a thermocouple capable of measuring the temperature of a hot gas in the duct.

16 Claims, 3 Drawing Sheets

METHOD AND APPARATUS FOR EXTENDING THE LIFE OF A HOT GAS DUCT THERMOWELL TUBE

FIELD OF THE INVENTION

This invention relates to a method and apparatus for extending the life of a thermowell tube positioned in a hot gas duct to contain a thermocouple capable of measuring the temperature of a hot gas in the duct.

BACKGROUND OF THE INVENTION

The use of burners positioned to generate hot gas for passage through a hot gas duct to heat water or other substances contained in heat exchanger tubes positioned in the duct is well known and is a widely used technique for generating steam and the like. Frequently, the gases passed through such hot gas ducts are at temperatures of up to at least 1100° F. to about 1800° F. It is desirable to measure the temperatures of these gases reliably since excessive temperature can damage the heat exchange tubes and the like. These temperature measurements are frequently made by positioning thermowell tubes across the height of the duct to contain a thermocouple, which then senses the temperature of the hot gas flowing through the duct. In many instances, these tubes are suspended from the top of the duct and extend to a bottom restraint in the bottom of the duct so that the tube is restrained at both the top and the bottom of the tube. The tube is typically slideably restrained at the bottom of the duct so that it may thermally expand and contract.

In the use of such thermowell tubes it has been found that when temperatures above about 1200° F. are used, the thermowell tubes degrade thermally over relatively short periods, i.e., typically one year or less. This degradation is the result of a number of factors, but a significant factor is the fact that elevated temperatures in the range of up to 1100° F. to 1800° F. are well above the creep range for even high temperature stainless steels and the like. As a result, it has been necessary to replace such thermowell tubes relatively frequently.

Since the replacement of these tubes is relatively expensive and since it results in an interruption of operations, methods have been sought to extend the life of such thermowell tubes.

SUMMARY OF THE INVENTION

It has now been found that the life of such thermowell tubes can be extended by the use of an extended life thermowell tube comprising: (a) a thermowell tube adapted to contain a thermocouple and having a top and a bottom, and an upstream side and a downstream side relative to a gas flow past the thermowell tube; (b) a surface near the thermowell tube bottom positioned to engage a restraining surface on a gas duct containing at least a major portion of the thermowell tube; and, (c) a thermowell stiffener positioned on the downstream side of the thermowell tube.

The invention further comprises; a method for extending the life of a thermowell tube having a top and a bottom and a downstream side relative to a hot gas flow through a hot gas duct and positioned in the hot gas flow in the hot gas duct to contain a thermocouple capable of measuring the temperature of the hot gas flow in the hot gas duct; the thermowell tube being fixed at its top and its bottom relative to the hot gas flow past the thermowell tube; the method comprising positioning a thermowell tube stiffener on the downstream side of the thermowell tube.

DESCRIPTION OF PREFERRED EMBODIMENTS

In the discussion of the Figures, the same numbers will be used throughout to refer to the same or similar components. Further, additional components required for the operation of such systems as known to those skilled in the art have not been shown for simplicity.

Figure 1:
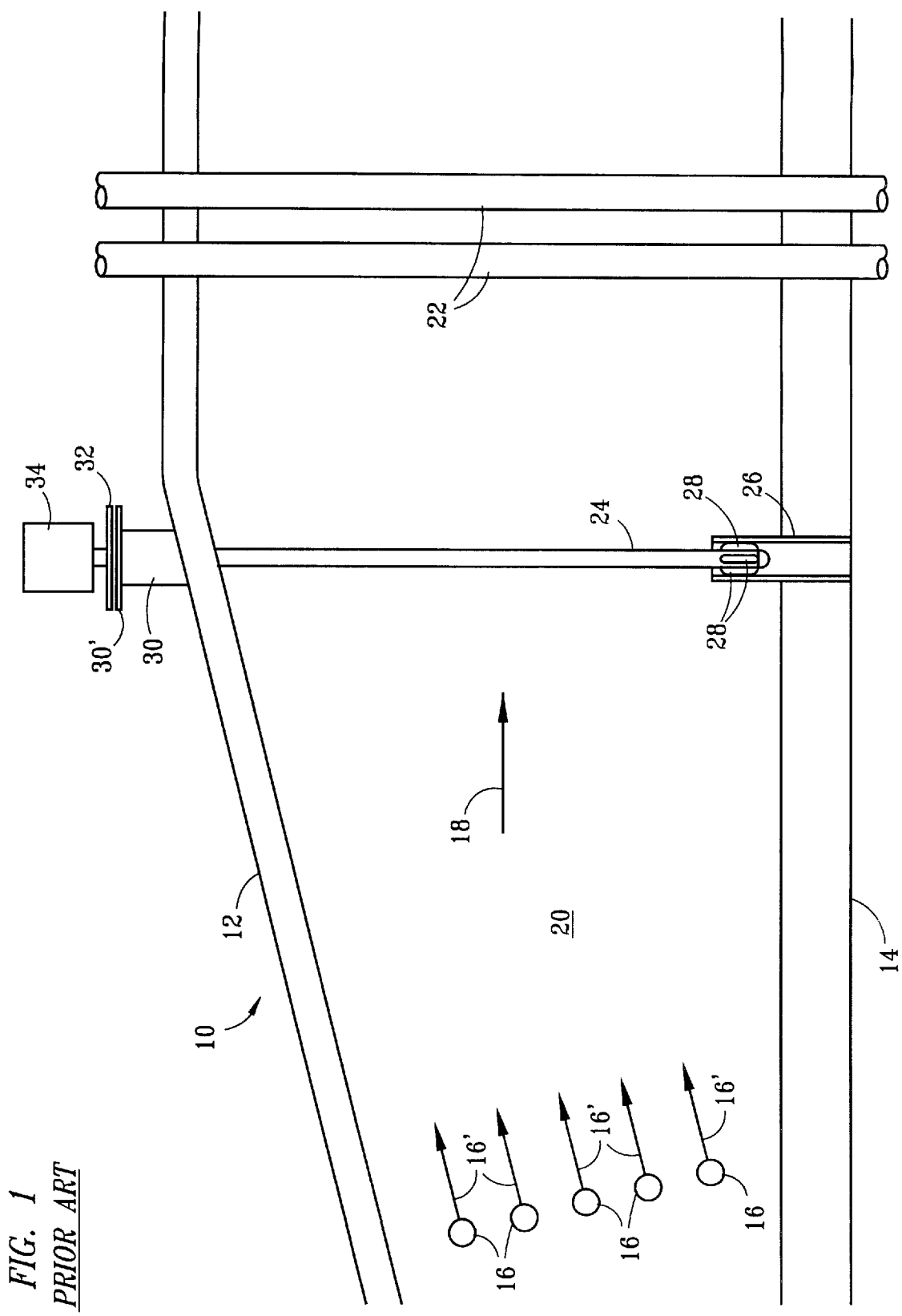
FIG. 1 is a schematic diagram of a prior art hot gas duct, including a thermowell tube, for heating fluids in heat exchange tubes.

In FIG. 1, a hot gas duct 10 is shown. Hot gas duct 10 includes a top 12 and a bottom 14 and a first and second side, one of which is shown as side 20. Hot gases are produced by combustion of carbonaceous or hydrocarbonaceous fuel in burners schematically shown at 16 which generate gases which are discharged as shown by the arrows 16'. The hot gases flow through duct 10 as shown by arrow 18. The hot gases are at a suitable elevated temperature to heat fluids contained in heat exchange tubes 22. A plurality of tubes 22 are used as required to extract the desired heat from hot gases in duct 10. Typically, tubes 22 are heat exchange tubes for the generation of steam, which may be used to drive a turbine, or for other process purposes in a variety of chemical, refining or other applications. To control the temperature of the hot gases in duct 10, thermowell tubes are positioned in duct 10. Thermowell tubes 24 as shown are commonly used. These thermowell tubes typically extend across substantially the entire height of duct 10 and are typically suspended from top 12 as shown in FIG. 1 by a support 30. Support 30 as shown includes a flange 30', which mateingly engages a flange 32 as known to those skilled in the art. A thermocouple signal sensor 34 is positioned above flange 32 and typically contains connections to measure signals from a thermocouple positioned inside thermowell tube 24. Thermowell tube 24 also includes near its lower end wear sleeves 28 which are sized to slideably engage a guide pipe 26 on bottom 14 of duct 10. In operation, hot gases are produced by burner 16, and flow past thermowell tube 24 and tubes 22 to produce the desired steam at a desired temperature. It will be understood that one or more rows of tubes 22 can be used or a variety of other configurations as known to those skilled in the art may be used.

In many applications, hot gases having a temperature of up to about 1100° F. to about 1800° F. may be generated and passed into contact with tubes 22. At these temperatures, the walls of tubes 22 remain at a temperature well below the temperature of the hot gases by reason of the heat exchange with the fluids contained in tubes 22. By contrast, thermowell tube 24 does not contain a fluid for the removal of heat. Accordingly, the temperature of thermowell tube 24 quickly approaches the temperature of the hot gases flowing through duct 10 so that the temperature of the gases flowing through duct 10 can be accurately determined by the thermocouple in tube 24. Typically, thermowell tubes 24 are fabricated of stainless steel, such as 316 stainless steel or the like. At temperatures above about 1200° F., the creep range of such materials is exceeded. Accordingly, thermowell tubes 24 begin to deform as a result of the elevated temperature and the continued pressure against tubes 24 as a result of the flow of hot gases through duct 10 as shown by arrow 18. Tube 24 is restrained at both its top and its bottom by connector 30 and by guide pipe 26. Accordingly, thermowell tubes 24 begin to bend and deform and become more susceptible to mechanical deterioration. Harmonic motion in the thermowell tubes may also cause damage to the thermowell tube, the thermocouple, or both. For instance, a slight amount of bending of thermowell tube 24 results in an inability for sleeves 28 to slide upwardly and downwardly in guide pipe 26. The thermowell tubes as so restrained then become quickly vulnerable to mechanical deterioration with possible destruction of not only the tube, but the thermocouple as well. Further, the accuracy of the readings can be adversely affected. As a result, it has been necessary in the past to replace thermowell tubes frequently.

Figure 2:
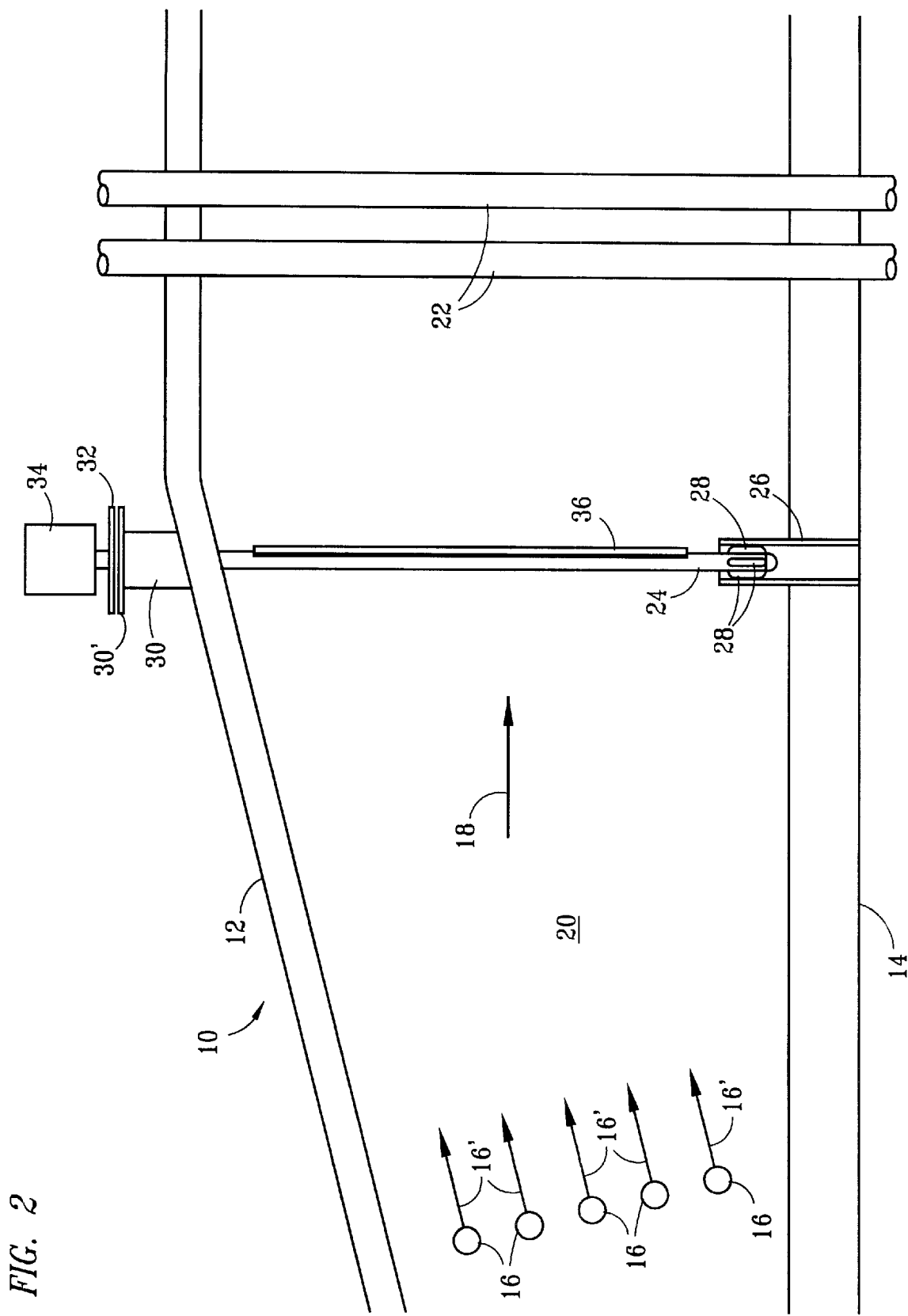
FIG. 2 is a schematic diagram of the hot gas duct of FIG. 1 showing a thermowell tube stiffener of the present invention positioned on the thermowell tube.

In FIG. 2, an embodiment of the present invention is shown. A thermowell tube stiffener 36 has been positioned on thermowell tube 24 on its downstream side relative to the gas flow. The stiffener is positioned to extend over a substantial portion and preferably substantially all of the length of tube 24. The stiffener may extend to within a foot of the top of the duct 10 and within a foot of the bottom of duct 10, or it may extend even closer to the top and bottom of duct 10. Preferably, the stiffener extends along the length of tube 24 over at least two-thirds of its length inside duct 10. The stiffener not only results in stiffening tube 24, thereby reducing possible harmonic motion and creep, but as a result of its configuration, it reduces the drag on tube 24 as a result of gas flow past tube 24. Since the gas flow velocity may be 50 feet per second or higher, a substantial force is exerted on tube 24 by the hot gas flow. Typically, tubes 24 may be as long as 30 feet or longer. Since these tubes are restrained at both ends, it is desirable that these tubes be reinforced and that some way be found to minimize and resist the drag forces on tube 24 as a result of the flow of hot gas past tube 24.

Typically, stiffener 36 is made of a high temperature stainless steel alloy such as 316 stainless steel and comprises an angle member. This angle member will be described in more detail in conjunction with FIG. 5. The angle member as positioned in FIG. 2, has been found to extend the useful life of tube 24 substantially and provides a useful life of up to triple the life previously achieved using such tubes without stiffeners.

Figure 3:
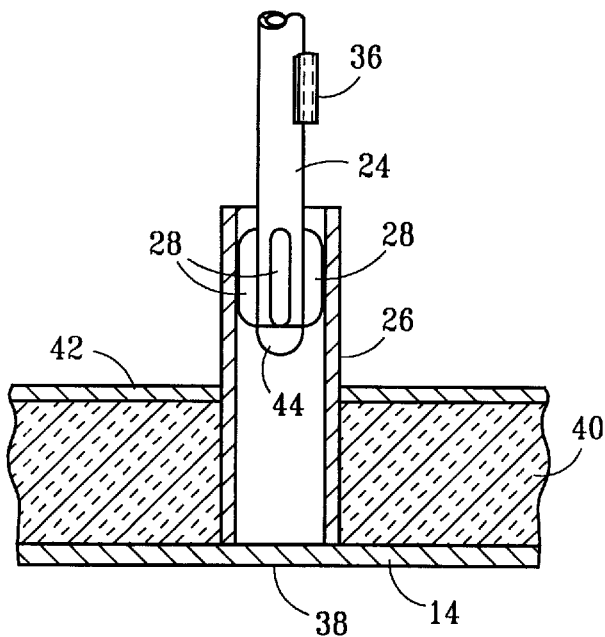
FIG. 3 is a schematic diagram of the bottom of a thermowell tube.

FIG. 3 shows the bottom of tube 24, including sleeves 28 as positioned in guide pipe 26. As shown, it is clear that tube 24 can longitudinally expand and contract within guide pipe 26. Bottom 14 of duct 10 is fabricated as shown with an outer shell 38, which typically may be a material such as 0.25 inch thick carbon steel with a ceramic fiber insulating material 40 being positioned between outer shell 38 and an inner shell 42, which may typically be a material such as 0.95 inch thick stainless steel. Such construction details are considered to be well known to those skilled in the art.

Guide pipe 26 may be of any suitable height, for instance, from about one to about three feet or higher.

Figure 4:
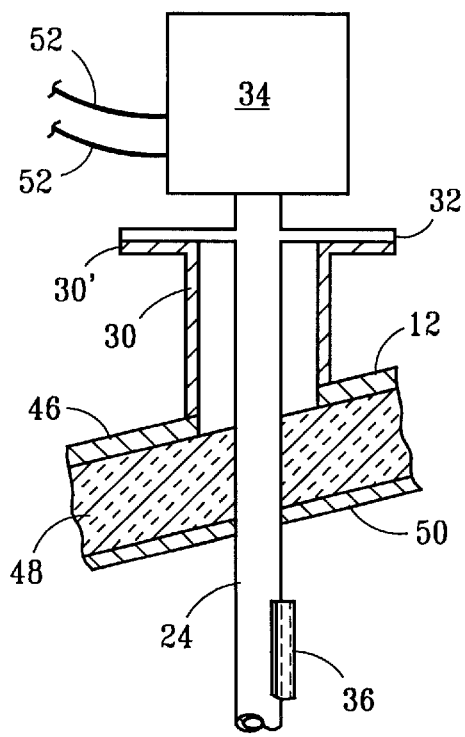
FIG. 4 is a schematic diagram of the top of a thermowell tube.

In FIG. 4, a top mount 30 is shown for supporting tube 24. The top of duct 10 comprises an outer shell 46 which may comprise 0.25 inch thick carbon steel with a ceramic insulation layer 48 being positioned between outer shell 46 and an inner shell 50 which may comprise 0.95 inch thick stainless steel. Tube 24 is desirably supported in support 30. Support 30 ends in a flange 30', which is adapted to mateingly, join a second flange 32, which supports a thermocouple sensor 34. Leads 52 are shown schematically depicting the electrical contacts necessary to determine the temperature in duct 10 via the thermocouple positioned in thermowell tube 24.

Figure 5:
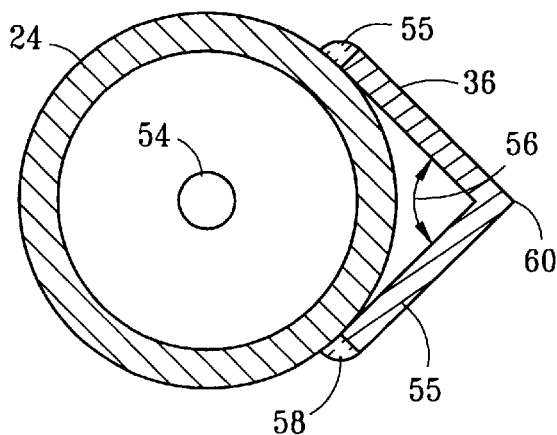
FIG. 5 is a top cross-sectional view of a thermowell tube, including a thermowell stiffener according to the present invention.

In FIG. 5, a cross-section of thermowell tube 24 is shown. A thermocouple 54 is shown positioned centrally in tube 24. Thermocouple 54 may be equipped with fins or other devices for centralizing thermocouple 54 in tube 24 if desired. Stiffener 36 comprises sides 55, which are joined to form an angle member at an angle 56. Typically, stiffener 36 is welded at welds 58 to tube 24. Desirably, an angled tip 60 of the stiffener 36 is directed downstream with respect to gas flow. This configuration results in a reduction of the drag on a downstream side of tube 24, thereby reducing the gas drag load on tube 24. Desirably, stiffener 36 is formed of a suitable high temperature alloy such as 316 stainless steel or the like. Stiffener 36 may be of any suitable size but is desirably sized to have an extension at its outer ends at welds 58 such that neither the welds nor the ends of stiffener 36 extend beyond the outer diameter of tube 24. Typically, when the diameter of tube 24 is from about 2.0 to about 3.0 inches in outer diameter, the outer dimensions of sides 54 will be from about 1.75 to about 2.50 inches. Typically, angle 56 is from about 60 degrees to about 120 degrees and is preferably at about 90 degrees.

EXAMPLE

In a hot gas duct having a bottom to top height of 25 feet, and a width of 15 feet, a plurality of thermowell tubes were used. These tubes included wear sleeves and a guide pipe on the bottom of the hot gas duct generally as shown in FIG. 1. The thermowell tubes had an outside diameter of 2.5 inches and an overall length inside ducts 10 of 22 feet.

A thermowell tube, including a 1¼ inch by 1¼ inch by 20 feet 316 stainless steel angle positioned on the downstream side of the thermowell tube was also installed. The hot gas duct was then used for the flow of gases at a temperature from about 1100° F. to about 1800° F. over an extended period of time. After about one year, the thermowell tubes of the invention were checked and it was found that there was no downstream deflection of these thermowell tubes and they appeared to be in the same condition as when installed. Tubes without the stiffener showed extreme downstream deflection and had to be replaced after one year. The tubes of the invention showed no downstream deflection after two years and were left in service.

In view of the foregoing example, it is clear that the use of the stiffener has surprisingly and unexpectedly extended the life of the thermowell tube. This extension in the life of the tube is considered to be the end result of a number of factors, not all of which are fully understood, but which include the strengthening of tube 24 in combination with at least one of creep reduction, and harmonic motion reduction on tube 24.

Having thus described the invention by reference to certain of its preferred embodiments, it is pointed out that the embodiments described are illustrative rather than limiting in nature and that many variations and modifications are possible within the scope of the present invention. Many such variations and modifications may be considered obvious and desirable based upon the foregoing description of preferred embodiments.

I claim:

1. An extended life hot gas duct thermowell tube system comprising:
   a) a thermowell tube adapted to contain a thermocouple and having a top and a bottom, an upstream side and a downstream side relative to a gas flow past the thermowell tube;
   b) a surface near the thermowell tube bottom positioned to engage a restraining surface on a gas duct containing at least a major portion of the thermowell tube; and,
   c) a thermowell tube stiffener positioned directly only on an outside surface of the downstream side of the thermowell tube and having a length equal to at least about two-thirds of the length of the thermowell tube.

2. The thermowell tube of claim 1 wherein the thermowell tube contains a thermocouple having a top and a bottom.

3. The thermowell tube of claim 1 wherein the thermowell tube stiffener comprises an angle member having two sides joined at an angle from about 60 degrees to about 120 degrees.

4. The thermowell tube of claim 3 wherein the angle is about 90 degrees.

5. The thermowell tube of claim 1 wherein the thermowell stiffener comprises stainless steel.

6. The thermowell tube of claim 1 wherein the thermowell tube is fabricated of a material capable of use at elevated temperatures.

7. The thermowell tube of claim 6 wherein the elevated temperature is at least about 1100° F. to about 1800° F.

8. The thermowell tube of claim 1 wherein the thermowell tube is positioned in a duct having a top and a bottom through which hot gases flow to a heat exchange zone.

9. The thermowell tube of claim 8 wherein the thermowell tube is restrained in a tube guide on the bottom of the duct.

10. The thermowell tube of claim 8 wherein the thermowell tube is supported from the top of the duct.

11. The thermowell tube of claim 1 wherein the surface comprises at least one wear sleeve positioned near the bottom of the thermowell tube and adapted to engage a tube guide positioned to restrain the thermowell tube relative to gas flow past the thermowell tube.

12. A method for extending the life of a thermowell tube having a top and a bottom and a downstream side relative to a hot gas flow through a hot gas duct and positioned in the hot gas flow in the hot gas duct to contain a thermocouple capable of measuring the temperature of the hot gas flow in the hot gas duct, the thermowell tube being fixed at its top and its bottom relative to the hot gas flow past the thermowell tube, the method comprising positioning a thermowell tube stiffener having a length equal to at least about two-thirds of the length of the thermowell tube directly only on an outside surface of the downstream side of the thermowell tube.

13. The method of claim 12 wherein the thermowell stiffener comprises an angle member having two sides joined at an angle from about 60 degrees to about 120 degrees.

14. The method of claim 12 wherein the angle is about 90 degrees.

15. The method of claim 12 wherein the temperature of the hot gas is at least about 1100° F. to about 1800° F.

16. An extended life hot gas duct thermowell tube system comprising:
   a) a thermowell tube adapted to contain a thermocouple and a having a top and a bottom, an upstream side and a downstream side relative to a gas flow past the thermowell tube;
   b) a surface near the thermowell tube bottom positioned to engage a restraining surface on a gas duct containing at least a major portion of the thermowell tube; and,
   c) a thermowell tube stiffener positioned directly only on an outside surface of the downstream side of the thermowell tube and having a length equal to at least about two-thirds of the length of the thermowell tube, the stiffener consisting essentially of an angle member having two sides, the sides being joined at their inner edges to form a point extending downstream from the downstream side of the thermowell tube with their outer edges being fastened to sides of the thermowell tube.

* * * * *

UNITED STATES PATENT AND TRADEMARK OFFICE
CERTIFICATE OF CORRECTION

PATENT NO. : 6,390,673 B1  
DATED : May 21, 2002  
INVENTOR(S) : John E. Camburn It is certified that error appears in the above-identified patent and that said Letters Patent is hereby corrected as shown below:

<u>Column 6,</u>
Line 24, "and a having a top and" should read -- and having a top and --

Signed and Sealed this

Seventeenth Day of September, 2002

Attest:

Attesting Officer

JAMES E. ROGAN
*Director of the United States Patent and Trademark Office*